United States Patent [19]

Mecklin et al.

[11] 3,943,845
[45] Mar. 16, 1976

[54] REPLACEABLE FEEDER FINGERS FOR A BALER

[75] Inventors: Charles D. Mecklin; Edward L. Robinson, Jr., both of Memphis, Tenn.

[73] Assignee: International Harvester Company, Chicago, Ill.

[22] Filed: Mar. 7, 1975

[21] Appl. No.: 556,234

[52] U.S. Cl. ................ 100/189; 100/142; 56/341; 198/223
[51] Int. Cl.² ................................ B30B 15/30
[58] Field of Search ........ 100/189, 188, 142; 308/3; 56/1, 341–343; 198/123, 124

[56] References Cited
UNITED STATES PATENTS

| | | | |
|---|---|---|---|
| 3,486,439 | 12/1969 | May et al. | 100/142 |
| 3,543,678 | 12/1970 | Hobbs | 100/189 |
| 3,620,359 | 11/1971 | Smith | 198/223 |
| 3,880,073 | 4/1975 | Eberly et al. | 100/189 X |

Primary Examiner—Peter Feldman
Attorney, Agent, or Firm—Neal C. Johnson; Floyd B. Harman

[57] ABSTRACT

A hay baler including a mobile chassis having a bale chamber and a power-driven plunger reciprocably mounted in the chamber for cyclically compressing hay in the chamber. A pickup lifts the windrowed hay from the ground and a feeding mechanism is reciprocably powered from the plunger to feed the hay into the bale chamber. The feeding mechanism includes a carriage mounted for reciprocation on a horizontal wall structure. A plurality of hay engaging fingers is pivotally suspended from the carriage beneath the wall structure for moving the hay from the pickup to the bale chamber. Each of the hay feeder fingers is removably secured to the carriage by a clamp disposed above the respective fingers. Openings are defined through the wall structure through which the clamps and the fingers are successively removable to facilitate replacement of worn or damaged fingers.

5 Claims, 6 Drawing Figures

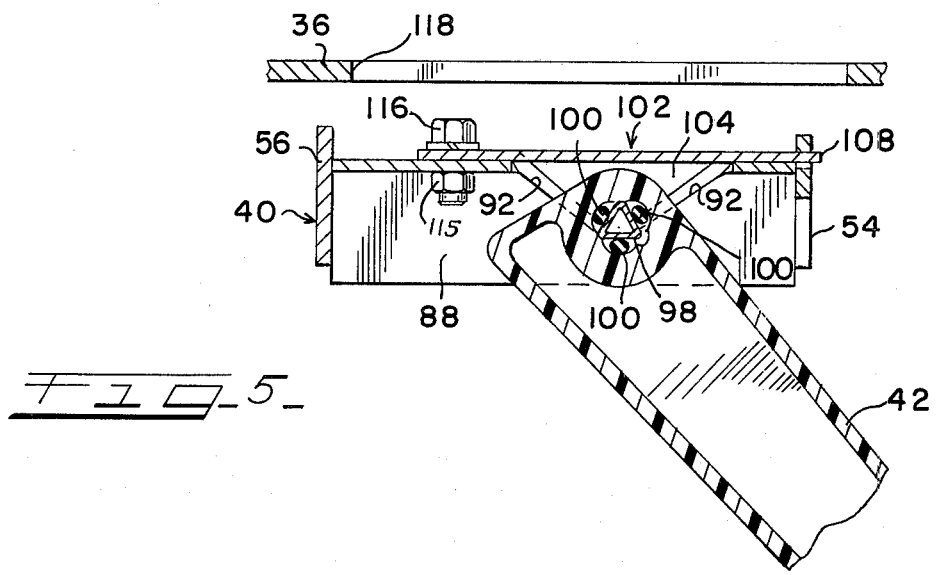
FIG_5_
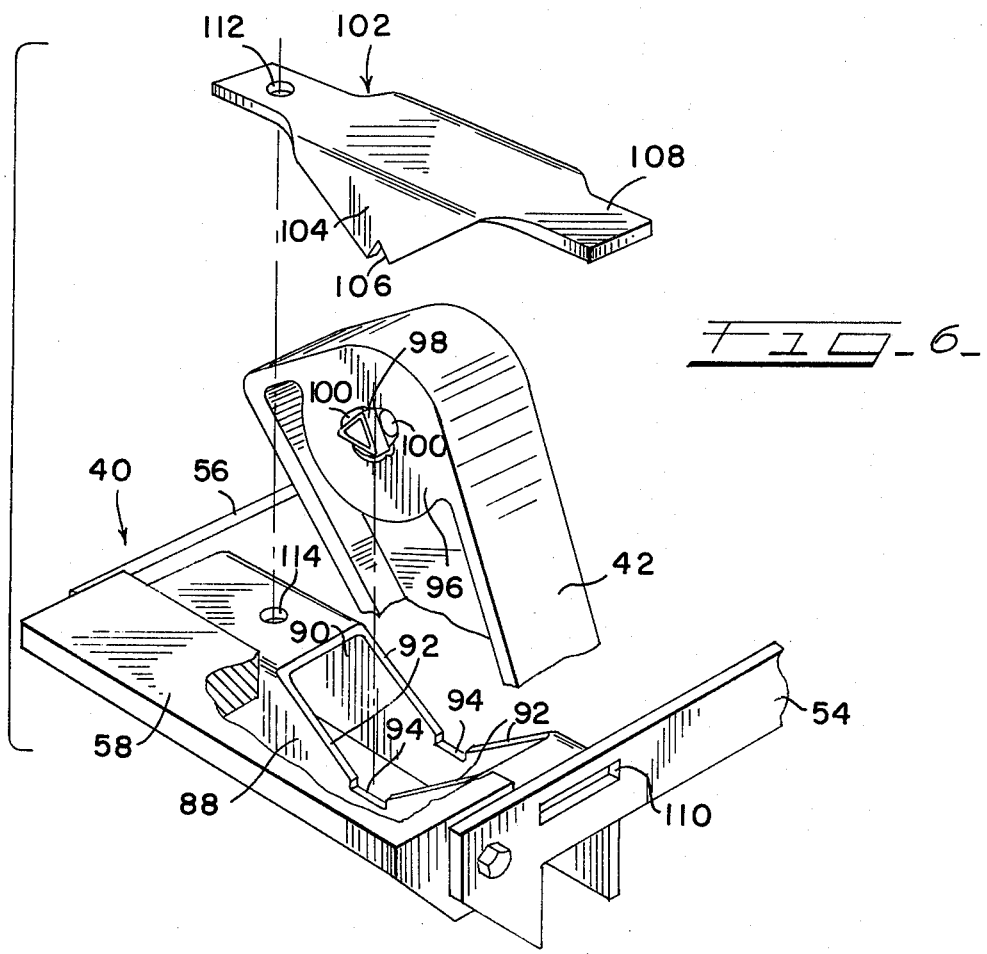
FIG_6_

REPLACEABLE FEEDER FINGERS FOR A BALER

BACKGROUND OF THE INVENTION

1. Field of the Invention

The invention relates generally to hay balers and more specifically to an improved feeding mechanism for the baler facilitating replacement of the feeder fingers thereof.

2. Prior Art

The prior art over which the present invention provides an improvement is exemplified by the cross feed mechanism 25 in a hay baler shown in U.S. Pat. No. 3,486,439. The carriage 49 supports a plurality of feeder fingers 55-58 and is supported for reciprocation in parallel guide rails 59 and 60. As shown in FIG. 3 the opposed rails 59 and 60 include coplanar surfaces defining the top wall structure for the cross feed housing 23.

In order to replace any of the feeder fingers 55-58 it is necessary to disconnect the carriage 49 from its cable drive structure, slide the carriage out of the rails 59 and 60, turn the carriage over to expose the fingers, remove the finger pivot shaft 63, and then remove the finger. The new finger is installed and the procedure is reversed.

It is apparent that the above procedure requires considerable time-consuming effort. The time involved may be particularly significant when replacement is required during the baling operation which must be rapidly completed due to considerations of crop conditions, weather, etc.

SUMMARY

The invention provides means for removably clamping the feeder fingers to the carriage of a cross feed mechanism which permits the fingers to be rapidly removed and replaced. More specifically, the carriage and the superposed wall structure are designed and cooperatively arranged to permit the fingers to be unclamped and removed upwardly from the carriage and through the wall structure. Consequently, it is unnecessary to remove the carriage with all the required steps set out above. A unique clamp is utilized to removably hold the feeder finger in operative position and is designed to be removed through the wall structure.

The primary object of the invention is to provide an improved baler cross feed mechanism wherein the feeder fingers thereof are quickly and easily replaceable with the result that delays or interruptions in field operation are minimized.

BRIEF DESCRIPTION OF THE DRAWINGS

FIG. 4 is an enlarged fragmentary side elevation view of the baler of FIG. 1;

FIG. 5 is a fragmentary enlarged sectional view taken along lines 5—5 of FIG. 2: and FIG. 6 is an exploded view of the finger mounting structure of the invention.

DESCRIPTION OF THE PREFERRED EMBODIMENT

Figure 1:
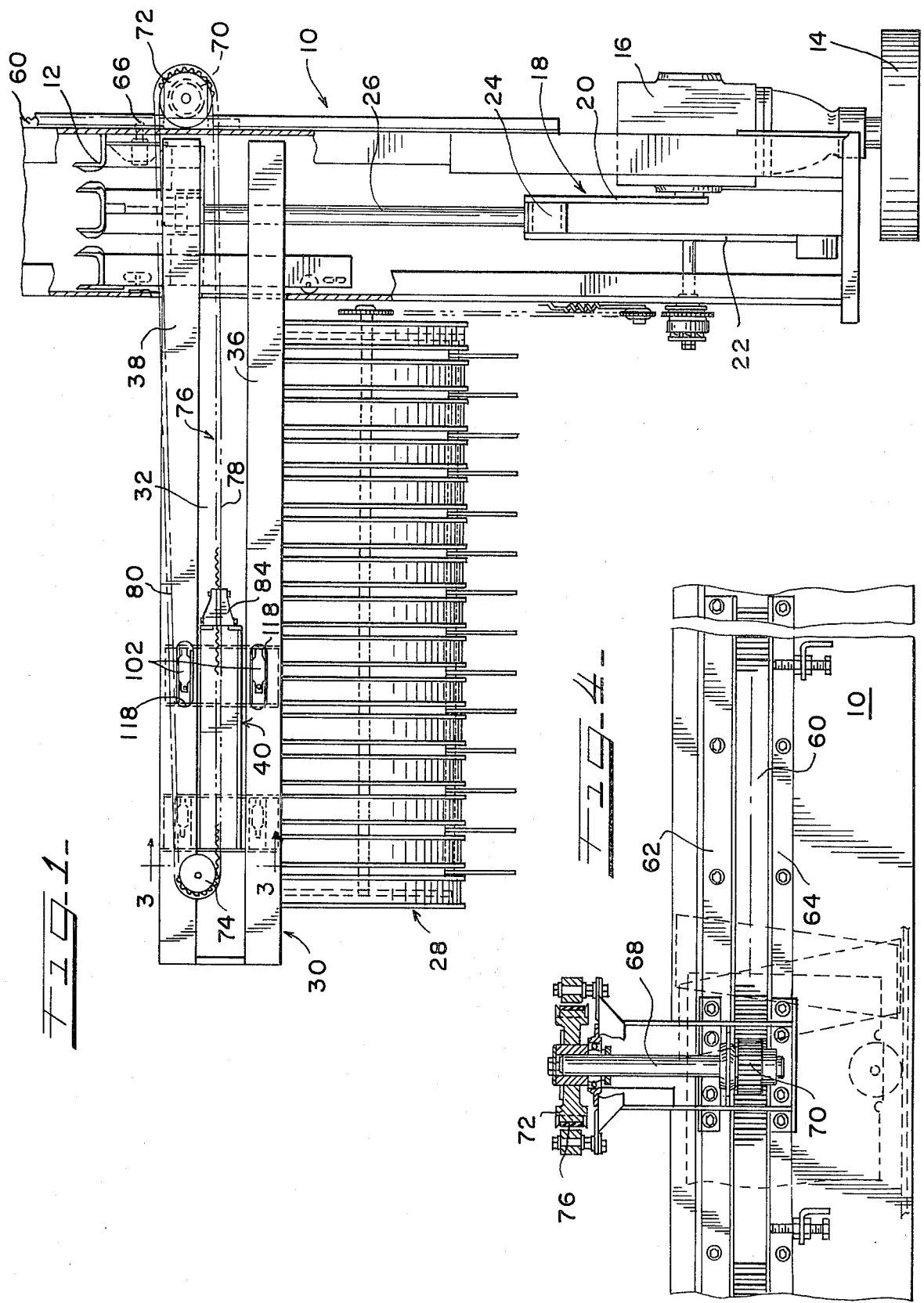
FIG. 1 is a fragmentary plan view of the principle components of a hay baler incorporating the removable feeder finger system of the invention.

Referring first to FIG. 1 there is shown some of the basic structure of a hay baler adapted for towing behind a PTO-equipped tractor for picking up windrowed hay and forming successive compacted and tied bales. The baler includes a longitudinally extending bale chamber 10 of generally rectangular section. A plunger 12 is slidably mounted within the bale chamber 10 for reciprocation in hay-compression and return strokes.

The plunger 12 is power driven from the towing tractor through suitable shafting (not shown) coupled to a flywheel 14. The power is transferred from the flywheel 22 through a gear type transmission 16 to a crank assembly 18. The crank assembly 18 includes parallel arms 20 and 22 interconnected and journalled at 24 to a pitman 26 pivotally connected to the plunger 12.

In accordance with usual construction the baler includes a hay pickup shown generally at 28 power driven from the plunger drive for lifting the windrowed hay upwardly and then rearwardly into a feed chamber shown generally at 30 disposed at right angles to the bale chamber 10. The chamber 30 includes a floor 32 (FIG. 1), a rear wall 34 (FIG. 3), and a top wall structure comprising a pair of transversely-spaced parallel plates 36 and 38 extending longitudinally of the feed chamber. The hay is moved along the feed chamber 30 and into the bale chamber 10 in timed relation to reciprocation of the plunger 12.

Figure 3:
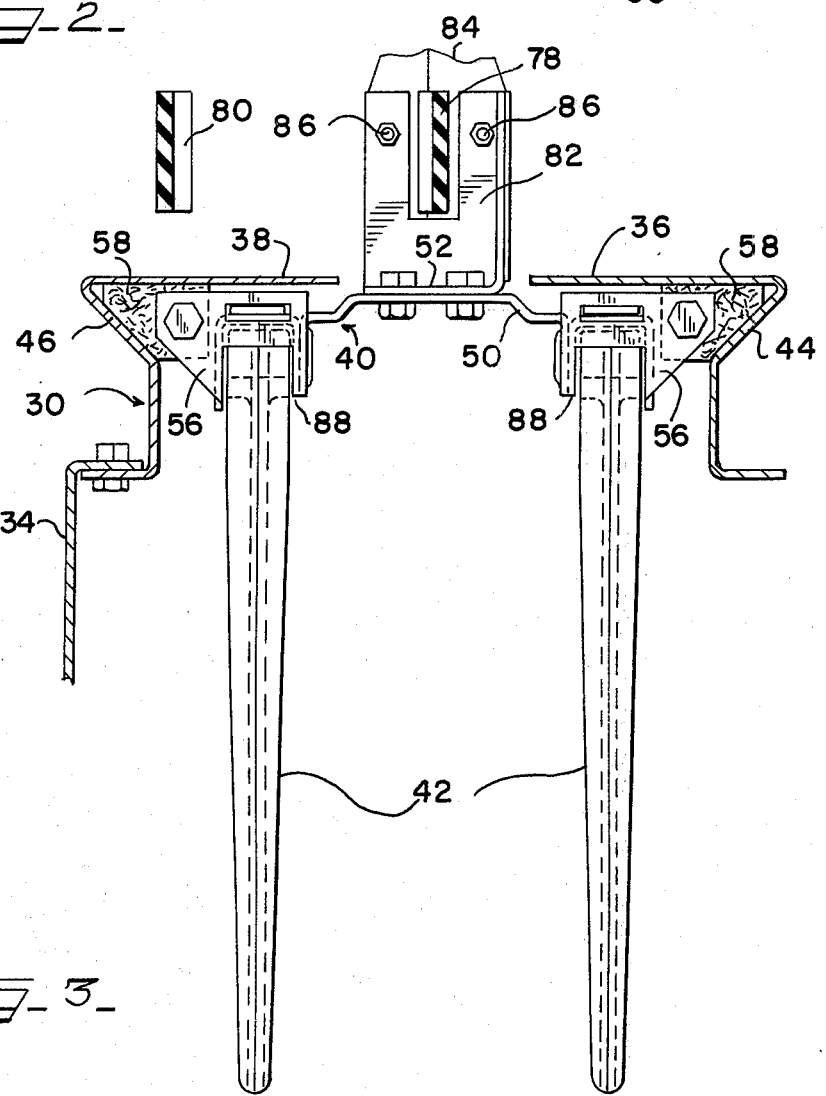
FIG. 3 is an enlarged fragmentary sectional view taken in the direction of lines 3—3 of FIG. 1.

The mechanism for feeding the hay into the bale chamber includes a track-mounted reciprocating carriage 40 of H-shape as viewed in plan supporting a plurality of depending teeth 42 (preferably four in number) for engaging and moving the hay. As shown in FIG. 3 the feed chamber top plates 36 and 38 include inwardly and downwardly inclined sections 44 and 46 disposed in opposed relation to define parallel tracks for the carriage 40 in conjunction with the undersides of the top portions of the plates 36 and 38.

The carriage 40 includes a pair of longitudinally-spaced transverse sections 48 and 50 rigidly interconnected by an elongated plate 52. Each of the sections 48 and 50 includes pairs of end plates 54, 54 and 56, 56. Wooden bearing blocks 58 are bolted between the pairs of end plates 54 and 56 so as to be disposed in pairs on the respective carriage sections 48 and 50. As best shown in FIG. 3 the blocks 58 are shaped to rest on the inclined ramp sections 44 and 46 so as to slidably support the carriage for reciprocation.

As mentioned above, the carriage 40 is reciprocated in timed relation to reciprocation of the plunger 12. As shown in FIGS. 1 and 4 an elongated toothed rack 60 is slidably mounted on the exterior of the bale chamber 10 between a pair of support and guide rails 62 and 64. The plunger 12 is connected to the rack 30 by a pin 66 which projects through an elongated slot (not shown) in the bale chamber wall. As shown in FIG. 4 a shaft 68 is mounted on the bale chamber 10. A pinion gear 70 is coupled to the lower end of the shaft 68 in driven engagement with the toothed rack 60.

Figure 2:
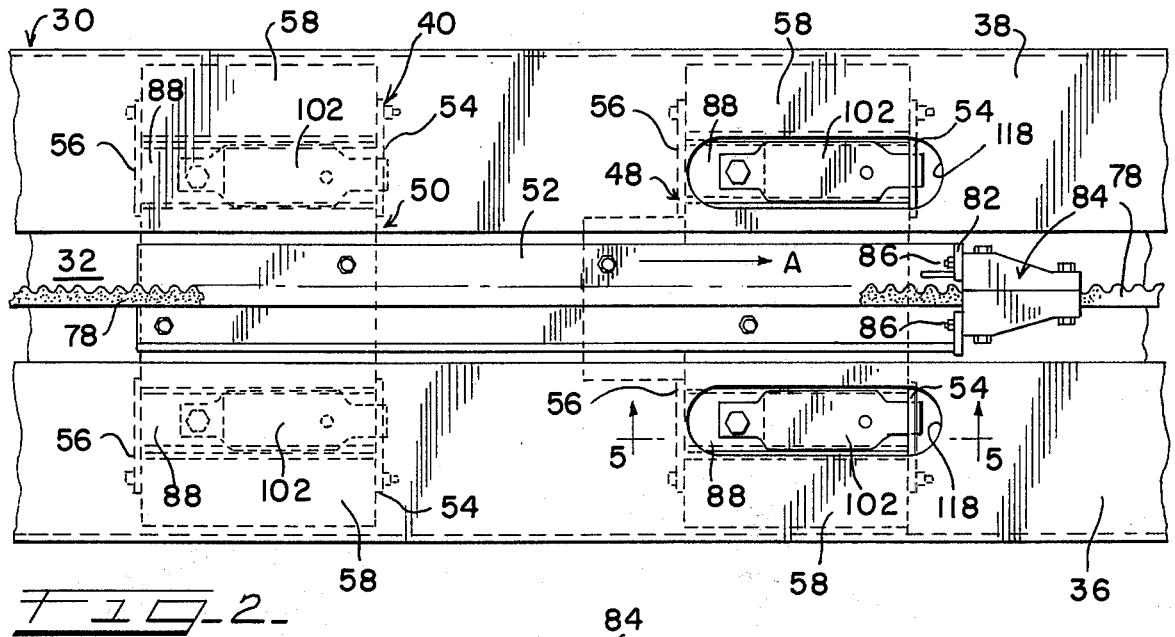
FIG. 2 is an enlarged fragmentary view of the feed chamber and finger carriage structure of FIG. 1.

A pulley 72 is secured to the upper end of the shaft 68 above the level of the bale chamber 10. As shown in FIG. 1 a second pulley 74 is mounted on the feed chamber 30 near its outer end on the same level as the pulley 72. An elongated flexible belt 76 is trained on the pulley 72 and 74 so as to extend therebetween in first and second runs 78 and 80. The carriage is coupled to the belt run 78 as structure best shown in FIGS. 2 and 3. A U-shaped plate 82 is welded to the forward end of the plate 52 of the carriage 40. A laterally separable block 84 is bolted into complemental engagement with the belt run 78 and is, in turn, bolted to the plate 82 by shear bolts 86.

In accordance with the invention means are provided for releasably retaining the feed fingers 42 on the carriage 40 enabling quick and easy removal and replacement of the fingers when required. Each of the four feed fingers 42 is mounted on the carriage 40 by means including a channel member 88 disposed laterally inboard of the four bearing blocks 58 of the carriage. In practice the channel members 88 extend between the end plates 54 and 56 and are welded in place so as to be rigid with the carriage. As best shown in FIG. 6 each of the channel members 88 has an opening 90 defined therethrough for receiving the feed finger 42. The opening 90 is defined in side elevation by pairs of downwardly inclined surfaces 92 which converge at transversely spaced and aligned seat portions 94 which are rectangular in side profile.

Each of the fingers 42 is made of a plastic material and includes a hub 96 at the upper end. A pivot shaft or pin 98 of polygonal cross section extends through the hub 96 and projects beyond the opposite sides of the finger. Three elongaged elastomeric members 100 are interposed between the shaft 98 and the finger hub 96 to provide a resilient pivot mounting of the finger 42 on the shaft 98.

It will be seen that the seat portions 94 will receive the finger mounting shaft 98 thereon with a complementary fit against the lower surface of the shaft. The finger 42 is retained in operative position by means including a clamp 102 releasably coupled to the carriage and engageable with the shaft 98. As shown in FIGS. 5 and 6 the clamp 102 includes a pair of downturned flanges 104 generally triangular in side elevation adapted to straddle the hub 96 of the finger 42. A notch 106 is defined in the lower apex of each of the flanges 104 to engage the protruding ends of the finger shaft 98 with a complementary fit thereon. The forward end of the clamp 102 includes a flat tab 108 shaped and sized to project into a slot 110 defined through the end plate 54. The rearward end of the clamp 102 is drilled at 112 and the channel member 88 is drilled at 114 in registry with the opening 112. A nut 115 is welded to the underside of the channel 88 in registry with the opening 114. A bolt 116 projects through the aligned openings 112 and 114 and is threadedly received in the weld nut 115 to retain the clamp 102 in operative position. As shown generally in FIG. 1 and more specifically in FIGS. 2 and 5, a pair of access openings 118 is defined through the top plates 36 and 38 spaced apart and sized to permit the clamp 102 and finger 42 to be withdrawn upwardly therefrom and installed downwardly therethrough.

The removal and replacement of the feed fingers 42 is a relatively simple procedure. The carriage 40 is moved to dispose a pair of the clamps 102 beneath the openings 118. The bolt 116 is removed and the clamp 102 is pulled out of the slot 110 and removed upwardly through the opening 118. This frees the finger 42 for removal upwardly through the opening 90 of the channel member 88 and through the access opening 118. A replacement finger is then inserted through the openings 118 and 90 and the pivot shaft 98 is received on the seat portions 94. It will be noted that the inclined surfaces 92 guide the shaft 98 downwardly into the seat portions 94. The clamp 102 is then inserted through the access opening 18 and into the slot 110. The bolt 116 is then threadedly inserted into the nut 115 and tightened. The complementary engagement of the notches 106 against the ends of the shaft 98 firmly sets the shaft into the seat portions 94.

By the foregoing Applicants have provided a simple and effective means for accomplishing the object of the invention.

What is claimed is:

1. In a hay baler having a bale chamber, a feed chamber communicating with the bale chamber, a wall structure defining the top of the feed chamber, a carriage reciprocably mounted on the wall structure for movement toward and away from the bale chamber, at least one feeder finger suspended from the carriage beneath the wall structure and extending into the feed chamber for moving hay toward the bale chamber, structure facilitating the replacement of the feeder finger comprising:

a clamp on said carriage for retaining said finger in operative position;
means for disconnecting said clamp from said carriage;
and an opening defined through said wall structure above said clamp and finger of a size permitting said clamp and finger to be moved upwardly therethrough, said finger including a pivot shaft projecting therethrough, said carriage including an upwardly facing seat for receiving said shaft, said clamp including a downwardly facing seat engageable with said shaft to releasably retain it between said seats.

2. In a hay baler having a bale chamber, a feed chamber communicating with the bale chamber, a wall structure defining the top of the feed chamber, a carriage reciprocably mounted on the wall structure for movement toward and away from the bale chamber, at least one feeder finger suspended from the carriage beneath the wall structure and extending into the feed chamber for moving hay toward the bale chamber, structure facilitating the replacement of the feeder finger comprising:

a clamp on said carriage for retaining said finger in operative position;
means for disconnecting said clamp from said carriage;
and an opening defined through said wall structure above said clamp and finger of a size permitting said clamp and finger to be moved upwardly therethrough, said carriage including a portion through which a slot is defined, said clamp including a first end shaped to project into said slot so as to be retained therein, and bolt means releaseably securing the opposite end of said clamp to said carriage, whereby said clamp is removable upon releasing said bolt means and withdrawing said first end from said slot.

3. In a hay baler having a bale chamber, a feed chamber communicating with the bale chamber, a wall structure defining the top of the feed chamber, a carriage reciprocably mounted on the wall structure for movement toward and away from the bale chamber, at least one feeder finger suspended from the carriage beneath the wall structure and extending into the feed chamber for moving hay toward the bale chamber, wherein the improvement resides in structure for releasably retaining the finger on the carriage comprising:

a transverse pivot shaft projecting beyond the opposite sides of said finger;

a seat defined on said carriage for receiving the oppositely projecting ends of said shaft;

and a clamp mounted on said carriage in releasable engagement with said shaft to hold it in said seat.

4. The subject matter of claim 3, wherein said shaft is polygonal in cross section, said seat and said clamp having shaft-engaging portions complemental to said polygonal cross section thereby retaining said shaft against rotation;

and means effective between said finger and said shaft permitting limited swinging movement of said finger about said shaft.

5. The subject matter of claim 4, including an opening defined through said wall structure above said clamp and said finger of a size permitting said clamp and finger to be removed upwardly therethrough.

* * * * *